Jan. 12, 1926.　　　　　　　　　　　　　　1,569,224
A. B. HALE
FRUIT MARKING MACHINE
Filed April 8, 1924　　3 Sheets-Sheet 3
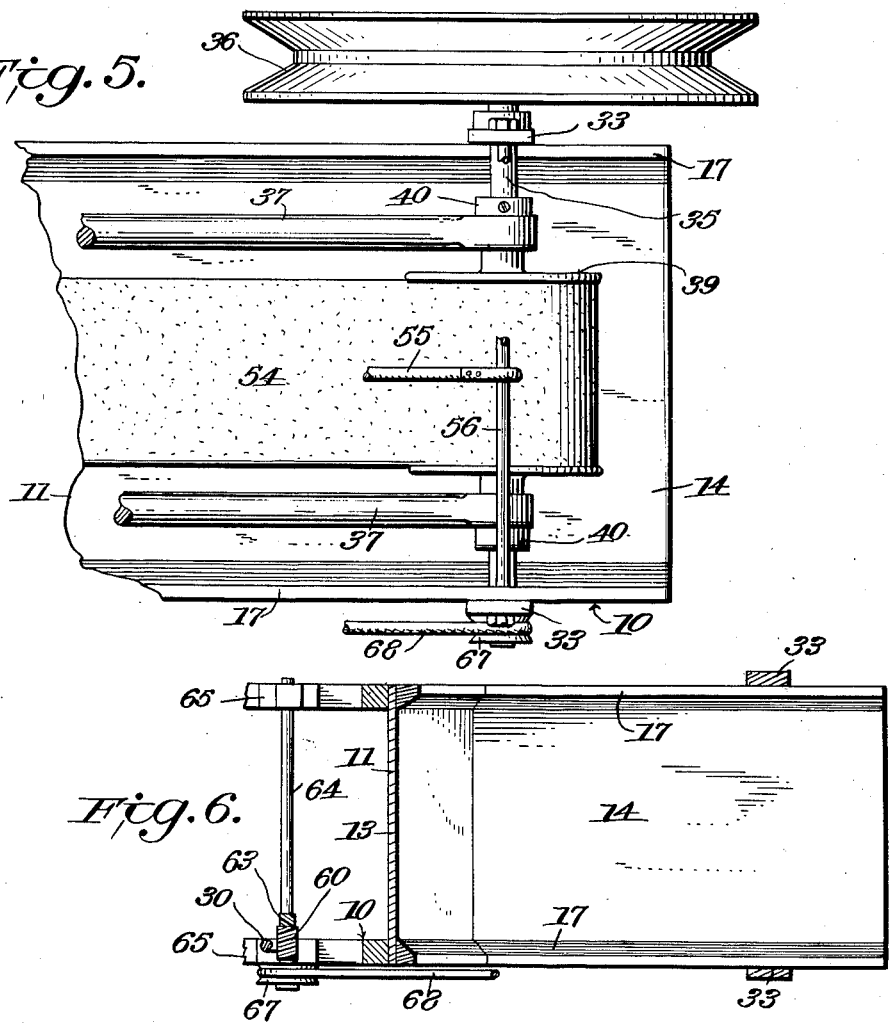
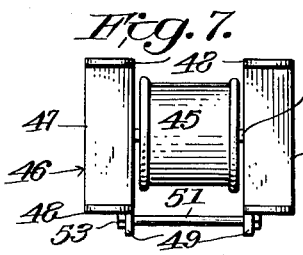
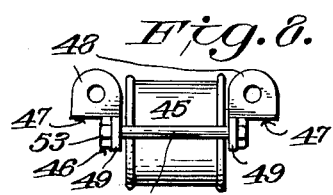
Inventor,
Arthur B. Hale,
By Bowser Phelps.
Attorneys Patented Jan. 12, 1926.

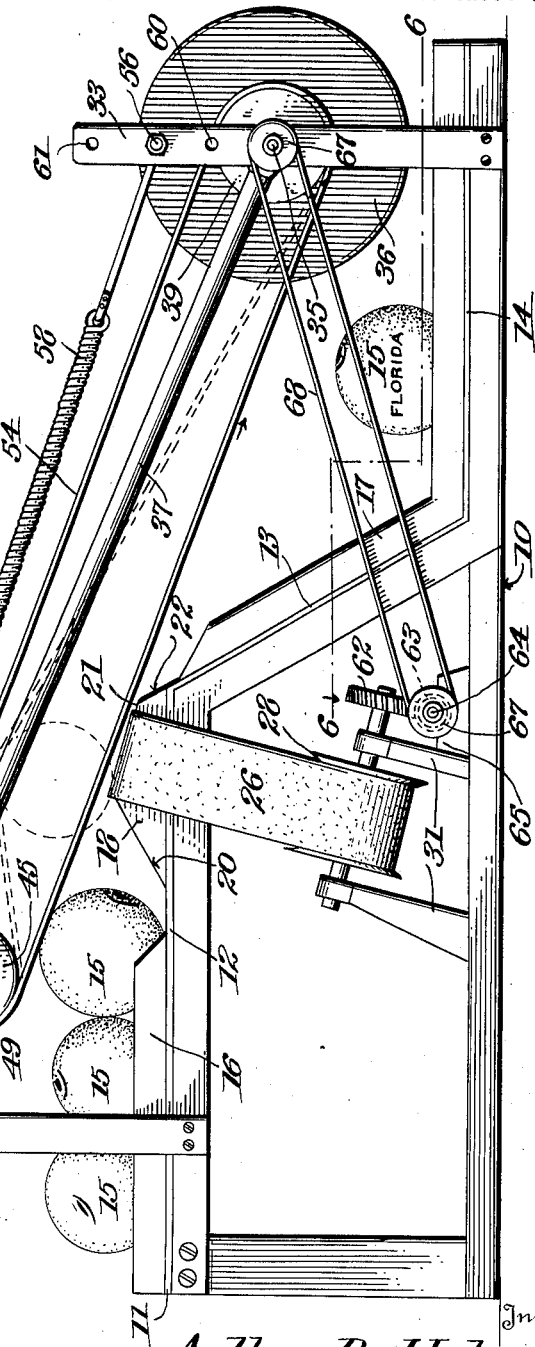

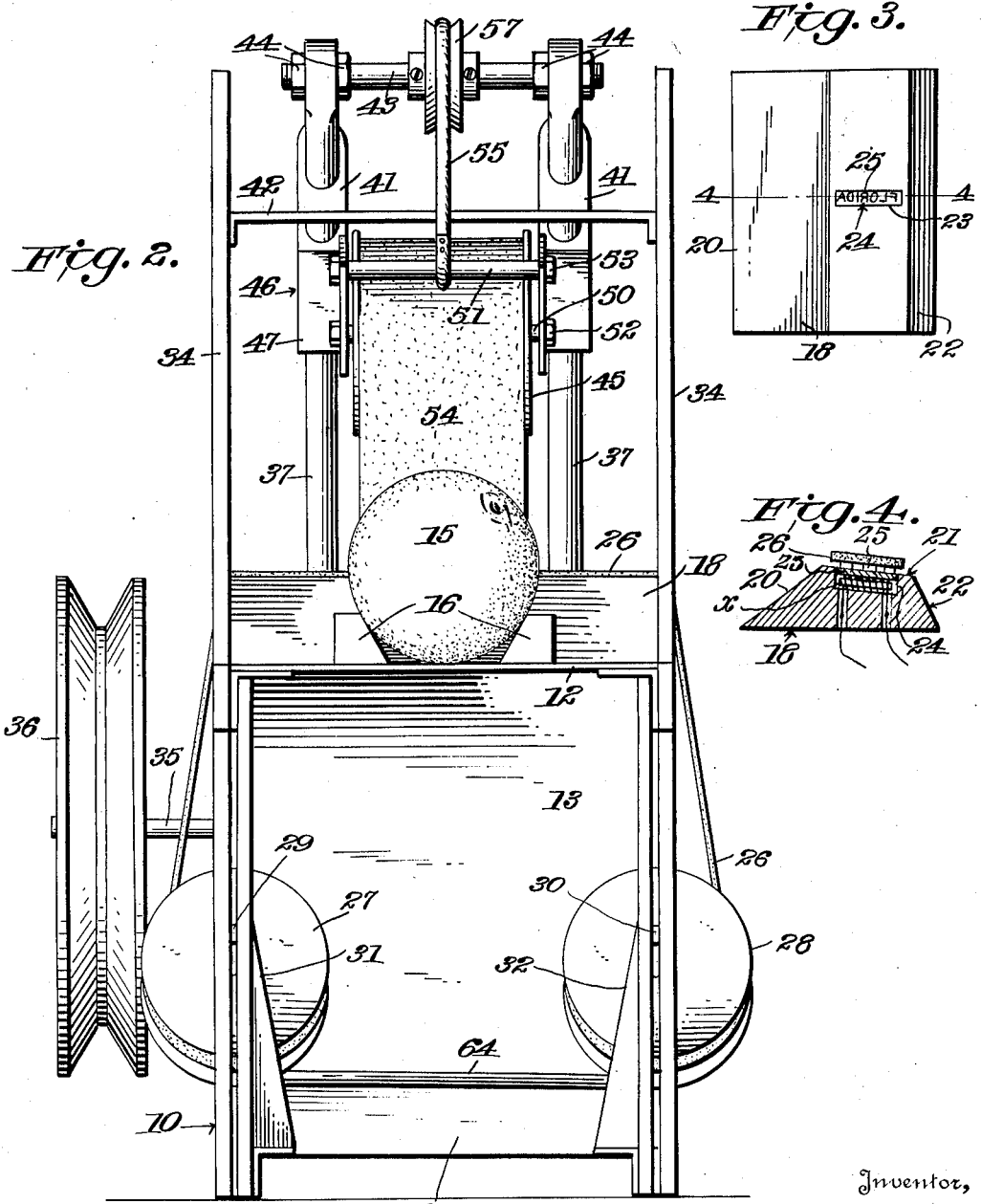

1,569,224

UNITED STATES PATENT OFFICE.

ARTHUR B. HALE, OF TAMPA, FLORIDA, ASSIGNOR, BY MESNE ASSIGNMENTS, TO F. J. SÉVIGNÉ MACHINE COMPANY, OF NASHUA, NEW HAMPSHIRE, A CORPORATION OF NEW HAMPSHIRE.

FRUIT-MARKING MACHINE.

Application filed April 8, 1924. Serial No. 704,978.

*To all whom it may concern:*

Be it known that I, ARTHUR B. HALE, a citizen of the United States, residing at Tampa, in the county of Hillsborough and State of Florida, have invented certain new and useful Improvements in Fruit-Marking Machines, of which the following is a specification.

This invention relates to a machine which is designed to delineate or mark a trademark, brand, or design particularly upon fruit, for instance, citrous fruit, and usually directly upon the skin thereof.

A prime object is to provide a novel means whereby although only a single article at a time is capable of being moved into operative relation to the marking means, yet the operation is performed on successive articles as rapidly as they can be fed to and through the machine.

A second object is to provide a machine of this character having raised or offset means constituting an abutment to forward travel of the article to be marked in combination with a yieldable conveyor engageable with the articles successively as they abut said means in order to move them over it to engage the marking means, and so arranged that the elevation or offsetting of said means will preclude engagement of succeeding oranges or articles by the conveyor while an article remains engaged thereby.

Another object is to provide such a machine having a yieldable endless conveyor belt engageable with the articles in a manner to materially deflect a run thereof so that the next succeeding orange cannot be engaged until release of the orange being marked.

Still another object is to produce a structure of this character in which one of the belt pulleys is automatically slidable against the action of tensioning means to compensate for its movement during operation according to the size and travel of the oranges.

A further object is to produce a machine in which oranges of different sizes will not interfere with operation and in which the parts may be adjusted for grades of oranges materially differing in size.

A further object is to provide a marking means and means to advance the oranges or articles with respect to the marking means, associated together in a novel manner for operation of the moving parts thereof synchronously from a common source of power.

Additional objects and advantages with an elaboration of the foregoing will become apparent from a consideration of the following description of the preferred form of my invention which is illustrated in accompanying drawings forming a part hereof. I do not limit myself to the showing made by the said description and drawings, since it is evident that I may adopt variations within the spirit and scope of the invention as set forth in appended claims.

In said drawings:—

Figure 1 is a view of the machine in side elevation;

Figure 2 is a view of the machine in rear elevation and on a larger scale than the preceding figure;

Figure 3 is a plan view of the riser block;

Figure 4 is a cross sectional view taken on the line 4—4 of Figure 3 and in addition showing the inked ribbon;

Figure 5 is a plan view of the front portion of the machine;

Figure 6 is a sectional view taken on the line 6—6 of Figure 1;

Figure 7 is a plan view of the movable pulley carriage and

Figure 8 is an end elevation of said movable pulley carriage.

The operating mechanism of the machine is supported by a skeleton frame or framework 10 carrying a metallic sheet or plate 11 of suitable width which forms a receiving table 12 at the rear of the machine, a downwardly and forwardly inclined portion 13 leading to a horizontal portion 14 located at the front of the apparatus. Oranges, grapefruit, other fruit or articles 15 are adapted to travel through the machine from the rear toward the front for the full length of sheet 11. The fruit or articles are either placed on table 12 by hand, roll along an incline thereto or are fed in any other approved manner. The machine as a whole may be slightly inclined to insure rolling of the articles by gravity over table 12 and portion 14. Spaced article-guiding strips 16 rise from table 12 and strips 17 similar in purpose and function thereto are disposed on the portions 13 and 14.

The purpose of so inclining the portion 12 is to cause the articles to automatically reach position where the foremost one will be temporarily arrested by the riser 18 as hereinafter explained.

Fastened upon and in offset relation to the table 12 adjacent its forward end is an offset means or riser 18 which may be a suitable block having a forwardly and upwardly inclined or cam surface 20, a slightly forwardly and downwardly inclined upper surface 21, and a forward surface 22 of the same inclination as portion 13 and flush therewith.

A marker or branding die 23 is carried by the riser 18 and may removably occupy a recess 24 at the upper surface 21 as best shown in Figures 3 and 4. The die 23 has printing characters 25 raised above surface 21. Movable across the die in a direction transversely of the table 12 is a printing ribbon 26 adapted to directly contact with the characters 25 and over which ribbon the fruit or articles pass under suitable downward pressure, so that the name, brand, design or the like may be printed thereon as suggested by "Florida" on the foremost orange in Figure 1. This ribbon is of the inked type and has its ends suitably fastened to spools 27 and 28 so as to be capable of removal, replacement or adjustment. Spools 27 and 28 are fixed on rotatable shafts 29 and 30 journaled in one or more bearings 31 and 32, respectively, on frame 10 and the shaft 30 is positively driven in one direction. This marking mechanism is to be considered as but one approved form as many variations are permissible, for instance, forms using a heated die to directly engage and brand the skin of the fruit, or a heated die to engage a ribbon arranged like that shown, but carrying a normally solid, heat-soluble ink. This last mentioned structure is illustrated in Figure 4 in which a suitable electric heater X is conveniently shown located below the die 23.

Rising from the sides of frame 10 are front standards 33 and rear standards 34. Standards 33 journal a transverse drive shaft 35 which may receive its power under appropriate control from a motor or any desired source, usually imparted to a pulley 36 keyed on said shaft 35. Upwardly and rearwardly inclined rods 37 at their forward ends have the shaft 35 journaled therein and they are held against lateral displacement by a pulley 39 located between them and keyed to shaft 35, and by set collars 40 on said shaft outwardly of the rods. Adjacent their upper ends, rods 37 pass through brackets 41 of a mounting and bracing bar 42 spanning and secured to standards 34 by set-screws 42'. Nearer their upper ends than and above brackets 41, a transverse shaft 43 passes through rods 37 and is fastened thereto by nuts 44. A pulley 45 similar in size to that at 39 is mounted by a carriage or traveller 46 (see Figures 7 and 8). Carriage 46 consists of side sections 47 from which lugs 48 rise at each end. Lugs 48 are appropriately apertured to slide along rods 37. Flanges 49 depend from sections 47 and are bridged by rods or shafts 50 and 51 in the form of bolts having nuts 52 and 53 securing them in place. The pulley 45 is journaled on shaft 50 and a flexible conveyor belt 54 of canvas or the like is trained thereover and over pulley 39. The lower run of this belt is in divergent relation to table 12 and surface 21 and is designed to frictionally engage the oranges or articles one at a time so as to move them up surface 20, across the inked ribbon 26 and die 19.

Traveller 46 is adapted to slidingly yield automatically according to the sizes and path of travel of the oranges in order that pulley 45 may always occupy the proper position to tension belt 54 and grip the fruit at the proper pressure. To this end, a cable or strap 55 is fastened to the rod 53 and a rod 56 which spans standards 33. Cable 55 is trained over a pulley 57 journaled on shaft 43 and has a contractile metallic spring 58 in its length.

The position of the parts illustrated will enable efficient operation even where the fruit varies somewhat in size. Adjustment is permissible when fruit of a size materially larger than normal is to be branded by bodily elevating the conveying and driving means. This is done by transferring the screws 42' to holes 59 in standards 34, and by transferring shafts 35 and 56, respectively, to holes 60 and 61 in standards 33.

Movement of the printing ribbon 26 is synchronous with travel of the belt 54 and imparted by drive shaft 35. Shaft 30, to this end, has a worm wheel 62 keyed thereto which meshes with a worm 63 carried by the transverse shaft 64 journaled in one or more bearings 65 on frame 10. Pulleys 66 and 67 are keyed, respectively, to shafts 64 and 35 and a belt 68 is trained over said pulleys.

Presuming the machine to be in operation, drive shaft 35 through the medium of pulley 39 moves the belt 54 in the direction of the arrow in Figure 1 and by means of pulley 66, belt 67, pulley 65, worm 63, worm-wheel 62, shaft 30 and spool 28 synchronously drives the printing ribbon 26 transversely of the block 18 directly over the characters 25 of die 24. The oranges or articles to be printed roll onto or are placed on table 12 and guided by the strips 18, are pushed or rolled toward block 18. The foremost orange, by frictional gripping contact on the part of belt or conveyor 54, is rolled or caused to travel by the latter, up the inclined surface 20, over ribbon 26 in line with the characters 25 following which the orange travels on surfaces 21, 23, 13 and 14 guided by strips 17. As the oranges roll over the characters 25, the belt 54 is under the tension of spring 58 and hence the oranges are pressed by the belt against ribbon 26 and characters 25 so as to effect the printing or branding on the article, and in the case of fruit, directly on the skin thereof. As the orange is engaged by the belt or conveyor at block 18, the orange cannot move laterally and hence it is unnecessary to have the strips 16 opposite the block. The movement of the orange is suggested by dotted lines in Figure 1 and in accordance therewith, due particularly to the offset block 18, the pulley 45 and carriage 46 slide along rods 37 to compensate therefor, under the tensioning action of spring 58. It is to be particularly emphasized that when the lower run of the conveyor or belt 54 is in engagement with one orange, it is maintained deflected away from the next following orange, so that it cannot engage the latter until the former has been branded and released. The orange next following the one being branded, will abut the block 18 at surface 20, which acts as a stop to temporarily arrest its movement and position it for automatic engagement by the conveyor following release of the next preceding orange. Branded or printed oranges may roll from portion 14 into receptacles or removed by hand therefrom for packing or otherwise.

The structure of the machine as illustrated and described is such that, in operation, as many articles such as oranges can pass through and be marked while travelling in a single row as can be marked with other machines which employ a plurality of units side by side. This is due to the riser or offset means 18 which temporarily arrests the foremost article while one article is being carried over it by the belt, said arrest being in a position where it is instantly engaged by the belt as soon as the preceding article has passed over said riser. Nothing else is required to time the passage of the articles, nor does anything operate to definitely space the articles.

When the machine includes means for heating the die, with an ink ribbon between it and the fruit, the die being stationary, several advantages are obtained: viz, correct operating temperature of the die is readily maintained, and less electric current is required than in machines employing a rotary wheel carrying a plurality of dies. It occupies less space and less care such as cleaning, and is of lower cost, the latter being due not only to relative cost of making one or a plurality of dies, but also to the fact that no mechanism is required to turn or shift the die.

I claim as my invention:—

1. A marking machine having a conveyor, stationary marking means for articles advanced by the conveyor, one of said means being displaceable through engagement with an article to prevent premature advancement of a succeeding article with respect to the marking means, and stationary means for temporarily arresting each article as it approaches the marking means.

2. A marking machine having a conveyor, marking means for articles advanced by the conveyor, means to permit lengthwise yielding movement of the conveyor, and means to cause a conveyor-engaged article to follow an offset course to the marking means, to thereby prevent premature advancement of a succeeding article with respect to the marking means.

3. A marking machine having a marking means, a yieldingly mounted conveyor to move articles with respect to the marking means, and a stationary abutment providing a surface over and above which the articles are adapted to travel toward the marking means arranged in substantially converging relation to the adjacent portion of the conveyor in the direction of the marking means, the said conveyor extending over both the abutment and marking means to roll the articles thereover.

4. A marking machine having a marking means, a yieldable conveyor to frictionally engage and move articles relatively to the marking means, a stationary abutment providing a surface over and above which the articles are adapted to travel toward the marking means, the said conveyor extending over both the abutment and the marking means to roll the articles thereover, a portion of the conveyor being located in advance of the marking means, and said surface and portion being arranged in converging relation in the direction of the marking means.

5. A marking machine having a receiving surface for articles to be marked, marking means for the articles offset from said surface, means providing a surface out of a straight line for travel of the articles thereover to the marking means, a conveyor to move the articles over the second mentioned surface to the marking means, means tensioning and mounting the conveyor for contraction, and the rear end of the conveyor being located a greater distance from the first mentioned surface than the corresponding dimensions of the articles.

6. A marking machine having a marking means, means to convey articles relatively thereto, stationary offset means over which the articles are conveyed to cause the engaged article to move the adjacent portion of the second mentioned means away from the next succeeding article and to constitute a stop to preclude advancing movement of the latter.

7. A marking machine having a marking means and a surface over which articles travel for engagement therewith, a conveyor belt having a surface to engage and move the articles to the marking means, one of said surfaces being arranged out of a straight line with respect to the other surface, and means tensioning and permitting longitudinal yielding movement of said conveyor belt.

8. A marking machine having a marking means and a surface over which articles travel for engagement therewith, a conveyor belt having a surface to engage and move the articles relatively to the marking means, one of said surfaces being arranged out of a straight line with respect to the other surface, a drive means for said conveyor belt, a pulley over which the conveyor belt is trained, a carriage on which said pulley is rotatably mounted, means slidably mounting said carriage, and a tensioning cable associated with the carriage.

9. A machine for marking articles capable of being rolled along, said machine having a marker and a guideway leading thereto, a yieldingly mounted belt for rolling the articles along the guideway and marker, means for causing each article as it approaches the marker to deflect the operative run of the belt away from the guideway, and means adjacent the marker to temporarily arrest the next following article in position to be engaged by the belt and advanced when the belt returns to normal position, characterized by the fact that the article is free to be rolled past the arresting means by the belt as soon as said belt returns to normal position.

10. A marking machine having a frame, marking means thereon, rods supported on the frame, a drive shaft journaled in the rods, a carriage slidable along said rods, a pulley on said shaft, a pulley on said carriage, tensioning means for said carriage, and a flexible conveyor trained over said pulleys to engage and move articles relatively to the marking means.

11. A marking machine having a frame, marking means thereon, rods, supporting means on the frame for said rods, rear standards on which said supporting means is adjustably mounted, a drive shaft journaled in the rods, forward standards adjustably journaling said drive shaft, a carriage slidable along said rods, a pulley on said shaft, a pulley on said carriage, tensioning means for said carriage, and a flexible conveyor trained over said pulleys to engage and move articles relatively to the marking means.

12. A marking machine having a frame, marking means thereon, rods supported on said frame, a transverse shaft journaled on said rods, a pulley intermediate said rods and on said shaft, a carriage slidable along said rods, a pulley journaled on said carriage and located intermediate said rods, an endless flexible conveyor trained over said pulleys for engagement with articles to move them relatively to the marking means, a transverse rod bridging the first mentioned rods, a pulley carried by the transverse rod, and a tensioning means trained over the last mentioned pulley and connected to the frame and to the carriage.

13. A marking machine having a marking means, rods supported on the machine, a drive shaft journaled transversely on the rods, a transverse rod connecting the first mentioned rods, a carriage slidable along the first mentioned rods, a pulley journaled on said carriage between the first mentioned rods, a pulley on the drive shaft between the first mentioned rods, a conveyor trained over the pulleys to move articles relatively to the marking means, a pulley journaled on the transverse rod between the first mentioned rods, and a tensioning cable trained over the last mentioned pulley and connected to the frame and to the carriage.

14. A marking machine having a receiving table portion, a discharge portion in a plane substantially parallel with the table portion, an inclined portion connecting the table portion and discharge portion, a marking means adjacent the front of the table portion serving as a stop to prevent premature advance of the articles to the marking means, and the machine being adapted for disposition in a position to insure angularity of the table and discharge portions whereby the articles may roll thereon.

15. A fruit marking machine having a stationary marker, an ink ribbon extending past and close to the marker, and means for rolling fruit past the ribbon under pressure to pinch the ribbon between the marker and the fruit.

16. A fruit marking machine having an ink ribbon, a stationary marker adjacent one surface of the ribbon, and means for rolling fruit past the opposite surface of the ribbon under pressure to pinch the ribbon between the marker and the fruit.

17. A fruit marking machine having a stationary marker, means for heating the marker, an ink ribbon extending past and close to the marker, and means for rolling fruit past the ribbon under pressure to pinch the ribbon between the marker and the fruit.

18. A marking machine having a raised table provided with a die adjacent the front thereof, an inked ribbon movable over the die, spool means for the ribbon on the frame below the table, a conveyor to move articles over the ribbon in line with the die, and a shaft having synchronous driving connection with the ribbon and conveyor.

ARTHUR B. HALE.